No. 658,675. Patented Sept. 25, 1900.
E. W. REED.
NUT LOCK FOR VEHICLE WHEELS.
(Application filed July 11, 1900.)
(No Model.)
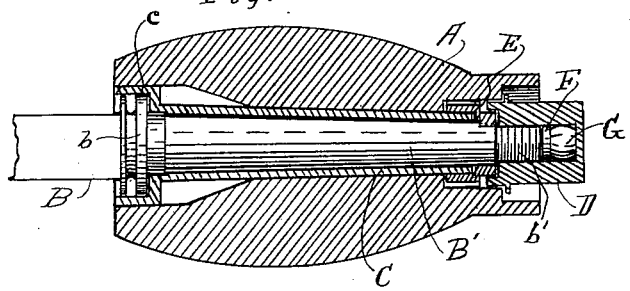
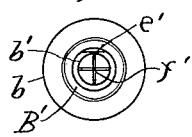
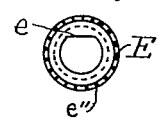
WITNESSES:
Georgia E. Cilley
A. Allgier.
INVENTOR.
Eugene W. Reed
BY Ithiel J. Cilley
ATTORNEY.

UNITED STATES PATENT OFFICE.

EUGENE W. REED, OF GRAND RAPIDS, MICHIGAN, ASSIGNOR OF ONE-HALF TO LORENZO D. STEWARD, OF SAME PLACE.

NUT-LOCK FOR VEHICLE-WHEELS.

SPECIFICATION forming part of Letters Patent No. 658,675, dated September 25, 1900.

Application filed July 11, 1900. Serial No. 23,255. (No model.)

*To all whom it may concern:*

Be it known that I, EUGENE W. REED, a citizen of the United States, residing at Grand Rapids, in the county of Kent and State of Michigan, have invented certain new and useful Improvements in Nut-Locks for Vehicle-Wheels, of which the following is a specification.

My invention relates to appliances for securing vehicle-wheels to the axletree; and its objects are, first, to provide a means whereby the sliding of the thimble upon the spindle caused by long and continuous wear may be taken out and avoided, and, second, to avert the danger of the nut becoming loose and jarring off. I attain these objects by the mechanism illustrated in the accompanying drawings, in which—

Figure 1 is a sectional view of a wagon hub and thimble, showing my invention in place. Fig. 2 is an end view of the spindle, showing a flat portion at the side and grooves at the end. Fig. 3 shows the construction of the washer that is placed upon the spindle to take up the endwise play or motion of a worn thimble and spindle. Fig. 4 is an end view of the nut-lock portion of my invention, and Fig. 5 is a side view of the end of a spindle and the nut-lock portion of my invention to more clearly illustrate the manner of applying the nut-lock.

Similar letters refer to similar parts throughout the several views.

It is a well-known fact that as a buggy or other like vehicle is used the shoulder $c$ of the thimble C becomes worn against the collar $b$ to such an extent that the thimble may slide longitudinally upon the spindle sufficiently to cause a very decided and unpleasant rattling of the wheel. To avert this, I employ a cupped thimble or washer E, so arranged that its one end will project over the end of the thimble C. This washer is provided with a flat surface $e$ at one side of its aperture, which is designed to act with the flattened surface $e'$ on the spindle to prevent it from turning with the thimble in the wheel.

To complete my invention and render it fully operative, I find it necessary to provide a cheap practicable means of securing the nut, and for this purpose I cut a crease or creases $f'$ in the end of the spindle and place a disk F, having a spring, as G, back of it, in the chamber of the nut D in position to force the disk against the end of the spindle, and I place a small projecting bead $f$ across the surface of the disk in position to engage the groove $f'$ in the end of the spindle, so that the disk cannot readily turn with the nut, and yet not sufficiently close to wholly avert its being turned when sufficient exertion is brought to bear upon the nut. This spring is made, preferably, of solid rubber, so that as the pressure is increased upon the disk by screwing the nut to place the spring will expand laterally and be brought to bear forcibly upon the sides of the chamber in the nut, which, together with the bead and groove hereinbefore mentioned, renders it possible to screw the nut to place with only the exertion of the hand and without a wrench without danger of the nut becoming loose and jarring off, as is frequently done with the ordinary nut.

The principal and very important advantage of this means of securing the nut to place lies in the fact that this locking device may be readily and inexpensively applied to any chambered nut and provides a perfect nut-lock with this class of nuts.

In the accompanying drawings, A represents the hub of a wagon or buggy wheel. B represents the end of the axletree.

B' is the spindle, upon which the thimble C revolves, and $e''$ represents serrations on the edge of the washer to facilitate cutting out the wood in the hub for the reception of the washer between the thimble and the hub, so that it may be readily ground in without the necessity of a special tool for the purpose, as by the use of these serrations I am enabled to force the washer against the hub with the screw or nut D, and then by making the wheel to revolve on the spindle the serrations will scrape the wood away and in a short time the washer will have embedded itself fully into the wood. $b'$ represents the threaded end of the spindle prepared for the reception of the nut D.

Having thus fully described my invention, what I claim as new, and desire to secure by Letters Patent of the United States, is—

1. The combination of a spindle, a chambered nut, a cupped washer, a metallic disk and a solid-rubber spring in the chambered nut back of the disk, the surface of said disk and the end of the spindle in interlocking contact, substantially as and for the purpose set forth.

2. The combination of a spindle and a chambered nut, a cupped washer having serrated edge, and a disk and spring within the chambered nut, substantially as and for the purpose set forth.

Signed at Grand Rapids, Michigan, July 5, 1900.

EUGENE W. REED.

In presence of—
ITHIEL J. CILLEY,
IRVING M. MOER.